United States Patent Office 3,079,169
Patented Feb. 26, 1963

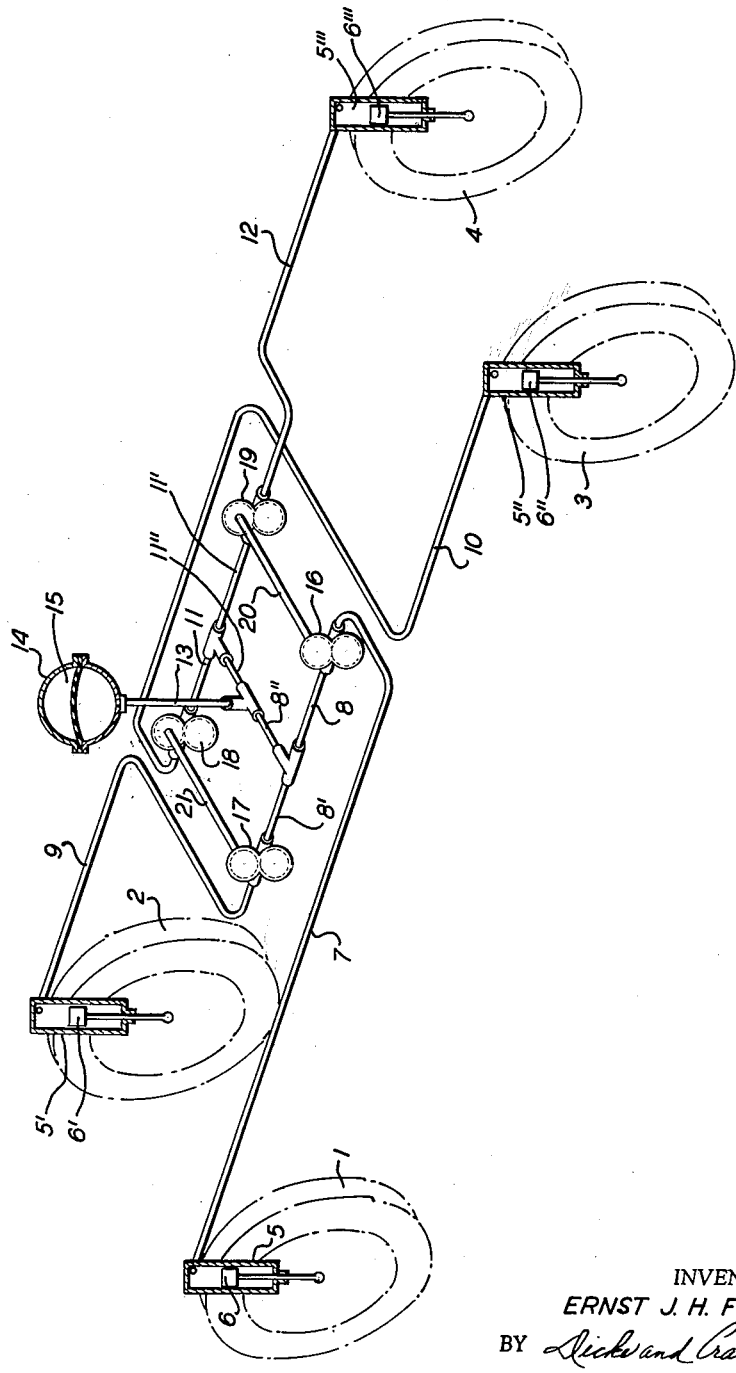

3,079,169
EQUALIZATION SPRING SYSTEM
Ernst J. H. Fiala, Sindelfingen, Kreis Boblingen, Germany, assignor to Daimler-Benz Aktiengesellschaft, Stuttgart-Unterturkheim, Germany
Filed Jan. 12, 1959, Ser. No. 786,327
Claims priority, application Germany Jan. 14, 1958
10 Claims. (Cl. 280—104)

The present invention relates to an equalization spring system for vehicles, particularly motor vehicles, in which the forces absorbed by each wheel are transmitted or conducted by means of a force transmitting means to a common spring and which is so constructed and arranged as to provide particularly favorable spring characteristics for the different spring movements of the vehicle wheels which may occur during normal driving conditions.

The present invention essentially consists in that the force transmitting means from each two diagonally opposite wheels are operatively connected with each other in the sense of a uni-directional spring or spring-stroke movement of the wheels, and more particularly are preferably operatively connected springily with each other for that purpose.

By the use of such an arrangement it is possible to achieve, with the aid of a relatively simple installation, a spring system having different spring characteristics as to spring-stiffness thereof during parallel spring movements parallel with respect to the road surface, while travelling over transversely disposed obstacles, and with inclinations of the vehicle while travelling through a curve, as well as during braking or accelerating of the vehicle.

In particular, it is possible by the use of an arrangement in accordance with the present invention to render relatively soft the parallel spring system and especially the spring characteristics thereof when travelling over transversely disposed obstacles extending over the entire wheel tread while, nonetheless, achieving a relatively stiff spring characteristic during curve traversals, accelerations and decelerations so that during the latter driving conditions, no vehicle tilting or only very slight tilting or inclinations of the vehicle occur.

Furthermore, the supporting structure or element of the vehicle such as the frame or vehicle body of a self-supporting vehicle is subjected to lesser torsional forces and, therefore, undergoes smaller torsional stresses with certain movements of the wheels, such as with the upwardly directed movement of two diagonally opposite wheels and with the simultaneous downwardly directed movement of the other two diagonally opposite wheels.

In accordance with the present invention, two oppositely disposed wheels, preferably the two front wheels and the two rear wheels of the vehicle are operatively connected with each other by a line or conduit system containing a hydraulic pressure medium and transmitting the forces absorbed by the individual wheels, the two line systems being preferably in communication with a common hydro-pneumatic spring. Hydraulic aggregates such as hydraulic motors and/or pumps are provided in each line system, namely to both sides of the branch lines leading to the common hydro-pneumatic spring, and two diagonally opposite hydraulic aggregates or units are operatively connected, preferably mechanically and especially by means of torsion rods.

Accordingly, it is an object of the present invention to provide an equalization spring system for vehicles, especially motor vehicles which is very simple in its overall arrangement and construction, reliable in operation thereof during all spring conditions, and requires relatively few parts, but which nonetheless offers excellent spring characteristics as to the different spring stiffnesses thereof exhibited for the different driving conditions which may occur in the vehicle.

Another object of the present invention is the provision of a simple, reliable and effective equalization spring system which makes possible to achieve the desired different spring stiffnesses for the different driving conditions.

Another object of the present invention is the provision of a simple spring equalization system for motor vehicles in which a common relatively soft hydro-pneumatic spring is used to produce, when the latter is operative, relatively soft spring characteristics, whereas relatively stiffer spring characteristics are effectively achieved by other spring means or spring devices so as to offer the relatively stiffer spring characteristics during other driving conditions.

These and other objects, features and advantages of the present invention will become more obvious from the following description when taken in connection with the accompanying drawing, which shows, in the single FIGURE thereof, a schematic perspective view of the spring equalization system in accordance with the present invention.

Referring now to the drawing, reference numerals 1, 2, 3 and 4 designate therein the two front wheels and the two rear wheels, respectively, of the vehicle. The spring movements of the four wheels 1, 2, 3 and 4 are transmitted to a hydraulic pressure medium over piston members 6, 6,' 6″ and 6‴ reciprocating within cylinders 5, 5′, 5″ and 5‴. The cylinders 5 and 5′ of the two front wheels 1 and 2 are thereby operatively connected with each other over a pipe line or conduit system 7, 8, 8′, and 9, while the cylinders 5″ and 5‴ of the two rear wheels 3 and 4 are operatively connected with each other over a pipe line or conduit system 10, 11, 11′ and 12. Branch connecting lines 8″ and 11″ are each connected to the connection between line portions 8 and 8′ and between line portions 11 and 11′ and lead to a common line 13 which, in turn, leads to a hydro-pneumatic spring 14 provided with an air space 15. Hydraulic aggregates which are operative either as motors or as pumps and which are designated by reference numerals 16, 17, 18 and 19 are arranged on both sides of the branch line 8″ and 11″, and more particularly are operatively interconnected at the points of connection of line portions 7 and 8, of line portions 8′ and 9, of line portions 11 and 10, and of line portions 11′ and 12. The hydraulic units 16 and 19 forming either pumps or motors are operatively connected with each other by means of a torsion rod 20 and the hydraulic units 17 and 18 are operatively connected with each other by means of a torsion rod 21.

OPERATION

The operation of the equalization spring system in accordance with the present invention is as follows:

*Spring Movements Parallel to the Road Surface*

During spring movements of the vehicle parallel with respect to the road surface, the pressure increases in lines 7, 9, 10 and 12 evenly, i.e., to the same extent so that the pressure in lines 8, 8′, 11, 11′, 8″, 11″ and 13 also increases. Consequently, the hydro-pneumatic spring 14 is rendered thereby effective or operative. The individual hydraulic motors or pumps thereby move in such a manner that no forces are transmitted by means of the torsion rods 20 and 21. Consequently, the spring system operates under these conditions exclusively by means of the hydro-pneumatic spring 14 which may be so selected and constructed, depending on the particular desire, as to be relatively soft since the hydro-pneumatic spring 14, as will be explained more fully hereinafter, has no influence on the tilting of the vehicle while driving through curves, during braking or during accelerations.

Traversal Over Transversely Extending Obstacles

If, for example, the two front wheels 1 and 2 drive over a transversely extending obstacle of width at least equal to the wheel tread, then the pressure in lines 7 and 9 increases so that the hydraulic motors 16 and 17 are set into motion to operate in mutually opposite directions, i.e., rotate in opposite directions, whereby the pressure in lines 8', 8, 11, 11', 8'', 11'' and 13 also increases. Simultaneously therewith, the movement of the hydraulic motors 16 and 17 is transmitted in this case over the torsion rods 20 and 21 to the hydraulic units 18 and 19 operative now as pumps to remove fluid from lines 10 and 12. Since torsion rods 20 and 21 connect the hydraulic units associated with diagonally opposite wheels, it is obvious that the diagonally opposite wheels will experience a like up-or-down movement. An increase in the pressure in line 7, for example, due to a raising of wheel 1 will through hydraulic unit 16, torsion rod 20 and hydraulic unit 19 cause a rise of the diagonally opposite wheel 4 due to a lowering of the pressure in line 12. Consequently, the three springs 14, 20 and 21 become effective or operative so that a relatively very soft overall spring system can be obtained while traversing transversely extending obstacles.

Nose-Dive or Nodding Movements During Braking or Accelerations

During accelerations or decelerations, for example, during braking-nose-dive movements, the pressure in lines 7 and 9 increases a predetermined amount while the pressure in lines 10 and 12 decreases by a corresponding amount. The increase in pressure in lines 7 and 9 leads to a movement of the hydraulic motors 16 and 17 in mutually opposite directions, i.e., to supply fluid under pressure in opposite directions in line portions 8 and 8'. The decrease in pressure in lines 10 and 12 causes the hydraulic motors 18 and 19 to move in mutually opposite directions, i.e., to cause partial vacuum or suction in opposite directions in line portions 11 and 11'. Consequently, no overall pressure increase occurs in the entire system 8, 8', 8'', 11'', 11', 11 and 13. The movement in different directions of hydraulic units 16 and 19 and of the hydraulic units 17 and 18 causes a twisting of the torsion rods 20 and 21. The inclination during braking, and correspondingly during acceleration, is, therefore, conditioned only on these two torsion rods 20 and 21 which may, therefore, be made relatively stiff. This spring stiffness has no effect at all on the soft spring characteristics during parallel spring movements and is noticeable only to a very small part thereof during the spring movements while passing over transverse obstacles.

Curve Drive

While driving through curves, for example, through a left curve, the pressure in lines 9 and 12 increases to the same extent as it decreases in lines 7 and 10. In that manner, the two pairs of hydraulic units 16 and 19 and 17 and 18 are again influenced in such a manner that the torsion rods 20 and 21 connecting the same are twisted without thereby increasing the overall pressure in the system 8, 8', 8'', 11'', 11', 11 and 13. Consequently, while driving through a curve, the curve tilting or curve inclination is only conditioned by or dependent on the relatively stiff springs 20 and 21.

Rattle Movements

During rattle movements of the vehicle, for example, when the wheels 1 and 4 move upwardly while the wheels 2 and 3 move downwardly, only the hydraulic medium in line system 7, 8, 8', 9 and 10, 11, 11', 12 is moved to and fro without resistance so that the overall pressure in the entire line system 8, 8', 11, 11' and 13 does not change while the torsion rods 20 and 21 do not have to transmit any torque. Consequently, during these rattle movements, only relatively small torsional forces or resulting stresses are transmitted to the vehicle itself which are the result of the inertia of the fluid columns.

While I have shown and described one embodiment in accordance with the present invention, it is understood that the same is not limited thereto but is susceptible of many changes and modifications within the spirit and scope of the present invention. The transmission of the forces may take place, instead of by means of a hydraulic medium, for example, also purely mechanically, while other hydraulic aggregates such as piston aggregates with either rotating or reciprocating pistons may be used instead of the hydraulic gear motor or pumps 16, 17, 18 and 19 illustrated herein. Furthermore, if one of each of the pairs of hydraulic motors or pumps 17, 18 and 16, 19 are made of different size, then the steering characteristics of the vehicle may be influenced thereby.

Thus, the present invention is not limited to the particular embodiment described herein but is susceptible of many changes and modifications within the spirit and scope of the present invention and I, therefore, do not wish to be limited to the particular embodiment illustrated and described herein but intend to cover all such changes and modifications as are encompassed by the scope of the appended claims.

I claim:

1. An equalization spring system for motor vehicles having a plurality of oppositely disposed front and rear wheels forming at least two pairs of diagonally opposite wheels, comprising relatively soft common spring means, and force-transmitting means transmitting the forces absorbed by each individual wheel to said common spring means including two conduit means each operatively connecting a respective pair of oppositely disposed wheels with each other in such a manner that uni-directional spring movements thereof tend to cause a flow of pressure medium contained therein in opposite directions, branch line means connecting each of said conduit means to said common spring means, and connecting means in each of said conduit means including separate means associated with each pair of diagonally opposite wheels for interconnecting the wheels of each said pair of diagonally opposite wheels with each other, said last-mentioned means having a relatively stiff spring characteristic and having a tendency to produce uni-directional spring movements of the wheels in each said pair of diagonally opposite wheels with the occurrence of a spring movement of one wheel of a respective pair.

2. An equalization spring system for vehicles according to claim 1, wherein each said connecting means associated with a respective pair of diagonally opposite wheels includes a reversible hydraulic pump-motor unit operatively arranged in each of the conduit means between the wheel of said respective pair of diagonally opposite wheels associated therewith and the connection of said branch line means to said conduit means, and wherein said means having a relative stiff spring characteristic comprises mechanical means operatively connecting said two pump-motor units corresponding to diagonally opposite wheels with each other.

3. An equalization spring system for vehicles according to claim 2, wherein said common spring means is a hydro-pneumatic spring, and wherein said conduit means include a hydraulic pressure medium directly connected to said spring.

4. An equalization spring system for motor vehicles having springily supported oppositely disposed front and rear wheel means forming two sets of diagonally opposite wheel means, comprising a common spring means, force-transmitting means transmitting the forces absorbed by each individual wheel means to said common spring means, and separate means for each said set of diagonally opposite wheel means connecting the force-transmitting means for the front wheel means thereof with the force-transmitting means of the diagonally opposite rear wheel means thereof so that upon spring movement of one of the diagonally opposite wheel means in each set thereof in one direction said last-mentioned means has a tendency to produce a similar movement of the other wheel means in said set of diagonally opposite wheel means.

5. An equalization spring system for motor vehicles having a plurality of opposite disposed front and rear wheels forming at least two pairs of diagonally opposite wheels, comprising common hydro-pneumatic spring means, and force-transmitting means transmitting the forces absorbed by each individual wheel to said common spring means including means for separately and springily connecting the force-transmitting means associated with the wheels of each pair of diagonally opposite wheels with each other, said last-mentioned means being constructed and arranged so that upon movement of one of the wheels in each pair of said diagonally opposite wheels said means has a tendency to produce a unidirectional spring movement of the other of the wheels in the respective pair of said diagonally opposite wheels, and means operatively connecting oppositely disposed wheels with each other for transmitting the forces caused by only unidirectional spring movements thereof to said common spring means.

6. An equalization spring system for motor vehicles having a plurality of oppositely disposed front and rear wheels forming at least two pairs of diagonally opposite wheels, comprising a common spring means providing a relatively soft spring characteristic, and force-transmitting means transmitting the forces absorbed by each individual wheel to said common spring means and to the other of said wheels, said force-transmitting means including further means operatively and separately connecting the force-transmitting means associated with the wheels of each pair of diagonally opposite wheels with each other in such a manner that the force-transmitting means of diagonally opposite wheels are springily connected with each other so that upon separate movement of one said diagonally opposite wheels in each said pair said further means has a tendency to produce a unidirectional spring movement of the other of said diagonally opposite wheels in the respective pair.

7. An equalization spring system for vehicles according to claim 6, wherein said force-transmitting means includes a reversible means providing a relatively stiff spring characteristic with tilting movements of the vehicle about a longitudinal axis.

8. An equalization spring system for motor vehicles having a pair of oppositely disposed front wheels and a pair of oppositely disposed rear wheels forming two sets of diagonally opposite wheels comprising common spring means, and force-transmitting means transmitting the forces absorbed by each individual wheel to said common spring means including two conduit means containing a hydraulic pressure medium, each said conduit means operatively interconnecting the wheels of a respective one of said pairs of oppositely disposed vehicle wheels with one another and including branch line means operatively connected to said common spring means, and further means operatively and separately connecting the wheels of each set of diagonally opposite wheels with one another in such a manner that the force-transmitting means thereof are connected with each other in the sense of a unidirectional spring movement of the respective wheels including a plurality of hydraulic units adapted to operate either as pump or motor, one of said hydraulic units being operatively interconnected in each said conduit means on each side of the connection therewith of a respective branch line means between said connection and a respective one of said wheels, and separate connecting means operatively connecting the units associated with the wheels of each of said pairs of diagonally opposite wheels with each other so that upon movement of one of the wheels in a respective set of said diagonally opposite wheels said further means has a tendency to produce a unidirectional spring movement of the other of the wheels in said respective set of said diagonally opposite wheels.

9. An equalization spring system for vehicles according to claim 8, wherein each connecting means includes a torsion rod means connecting the hydraulic units associated with a respective pair of diagonally opposite wheels.

10. An equalization spring system for motor vehicles having a plurality of sets of oppositely disposed wheels forming a plurality of sets of diagonally opposite wheels, comprising a relatively soft common hydropneumatic spring means, and separate force-transmitting means connecting each set of oppositely disposed wheels to enable unimpaired spring movements of the wheels in each said set in opposite directions while effectively opposing the spring force of said spring means to unidirectional spring movements thereof, each said force-transmitting means including a conduit means containing a hydraulic pressure medium and operatively connecting the wheels of a respective set of opposite wheels with each other in such a manner that unidirectional spring movements thereof tend to cause a flow of the pressure medium contained therein in opposite directions and branch line means connecting said conduit means with said common spring means for the passage thereto of the pressure medium, and separate connecting means for each set of diagonally opposite wheels arranged in said force-transmitting means providing a relatively stiff spring characteristic and effectively interconnecting the wheels of each set of diagonally opposite wheels with each other to produce unidirectional spring movements of the wheels of each set of diagonally opposite wheels with the occurrence of a spring movement of one wheel of a respective set, each said connecting means including a pair of reversible hydraulic pump-motor units, a respective one of said units being arranged in each said conduit means, and a torsion rod operatively connecting the two units with each other.

References Cited in the file of this patent

UNITED STATES PATENTS

| | | |
|---|---|---|
| 2,083,381 | Hutchinson | June 8, 1937 |
| 2,452,105 | Cosentino | Oct. 26, 1948 |
| 2,563,261 | Oster | Aug. 7, 1951 |
| 2,593,040 | Lloyd | Apr. 15, 1952 |

FOREIGN PATENTS

| | | |
|---|---|---|
| 68,500 | France | Nov. 12, 1959 |
| | (2nd addition to 1,100,585) | |